(12) United States Patent
Yang et al.

(10) Patent No.: US 8,391,252 B2
(45) Date of Patent: Mar. 5, 2013

(54) TECHNIQUES TO SUPPORT MULTIPLE RADIO-ACCESS TECHNOLOGIES

(75) Inventors: Xiangying Yang, Portland, OR (US); Muthaiah Venkatachalam, Beaverton, OR (US); Pouya Taaghol, San Jose, CA (US); Shantidev Mohanty, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1002 days.

(21) Appl. No.: 12/384,502

(22) Filed: Apr. 6, 2009

(65) Prior Publication Data
US 2010/0111047 A1   May 6, 2010

Related U.S. Application Data

(60) Provisional application No. 61/110,544, filed on Oct. 31, 2008.

(51) Int. Cl.
*H04J 3/00* (2006.01)
(52) U.S. Cl. ..................... 370/336; 370/395.4
(58) Field of Classification Search .............. 370/328, 370/329, 336, 528, 395.4
See application file for complete search history.

(56) References Cited

U.S. PATENT DOCUMENTS

| | | | |
|---|---|---|---|
| 2006/0276165 A1 | 12/2006 | Nakama | |
| 2009/0082017 A1* | 3/2009 | Chang et al. | 455/435.2 |
| 2009/0131110 A1* | 5/2009 | Balachandran et al. | 455/561 |
| 2010/0062800 A1* | 3/2010 | Gupta et al. | 455/552.1 |
| 2010/0067433 A1* | 3/2010 | Cheng et al. | 370/320 |

FOREIGN PATENT DOCUMENTS

| | | |
|---|---|---|
| WO | 2010/051517 A2 | 5/2010 |
| WO | 2010/051517 A3 | 7/2010 |

OTHER PUBLICATIONS

International Search Report and Written Opinion received for PCT Patent Application No. PCT/US2009/062903, mailed on May 31, 2010, 10 pages.
International Preliminary Report on Patentability received for PCT Patent Application No. PCT/US2009/062903, mailed on May 12, 2011, 5 pages.
Maheshwari et al., "Collocated Multi-Radio Coexistence for 802.16m Considerations and Proposals", IEEE 802.16 Presentation Submission Template, Revision 9, Document No. IEEE C802.16m-08/1083r2, Sep. 9, 2008, 18 pages.
Lee et al., "Multi-radio Coexistence", IEEE 802.16 Broadband Wireless Access Working Group, IEEE C802.16m-08/990, Sep. 5, 2008, pp. 1-5.
Okuda et al., "Femto BS coexistence with WiFi-AP", IEEE 802.16 Presentation Submission Template, Revision 9, IEEE C802.16m-08/1309r1, Nov. 6, 2008, 5 pages.

* cited by examiner

*Primary Examiner* — Brian D Nguyen
(74) *Attorney, Agent, or Firm* — Cool Patent, P.C.; Kenneth J. Cool; Joseph P. Curtin

(57) ABSTRACT

Techniques to permit scheduling of mixed radio access technologies. In some cases, a first radio access technology mode of a base station is scheduled during a first time region and a second radio access technology mode of a base station is scheduled during a sleep mode of the first radio access technology mode. In some cases, a first radio access technology mode of a base station is scheduled during a first time region and a second radio access technology mode of a base station is scheduled during an unused portion of the first time region. In some cases, a femto-base station is scheduled to snoop for local mobile stations during a sleep mode. Inactive regions of mobile stations are scheduled during a portion of sleep modes of the radio access technology modes.

10 Claims, 4 Drawing Sheets

| BS mode switching | Mode1: WiMAX | Mode2: LTE | WiMAX | LTE |
|---|---|---|---|---|
| WiMAX MS | AI | UAI | AI | UAI |
| LTE UE | DRX (a few TTIs) | CONNECTED | DRX | CONNECTED |

← Multiple of 5 ms →

US 8,391,252 B2

TECHNIQUES TO SUPPORT MULTIPLE RADIO-ACCESS TECHNOLOGIES

RELATED APPLICATIONS

This application is related to U.S. provisional application Ser. No. 61/110,544, filed Oct. 31, 2008, and claims priority to that date for all applicable subject matter and incorporates by reference the contents of that application in its entirety.

FIELD

The subject matter disclosed herein relates generally to techniques to schedule modes of operation of wireless devices.

RELATED ART

A mobile device consumes power even if the mobile device is not transmitting or receiving any data. Accordingly, the mobile device may turn off as many circuitry components as possible to save power. Sleep-mode operation (e.g., discontinuous reception (DRX) in 3GPP LTE (2009)) is a commonly used technique to save power in mobile client devices, such as cell phones.

FIG. 1 shows a prior-art sleep pattern having a fixed pattern of available intervals and unavailable intervals. In FIG. 1, available intervals are shown as AI, whereas unavailable intervals are shown as UAI. During an available interval, the mobile station communicates with the access point, but during an unavailable interval, the mobile station enters the sleep mode and conserves battery power. The mobile station negotiates a sleep pattern with an access point, and synchronizes the un-active intervals of the mobile station with the sleep pattern of the access point. A home office access point may have this feature to save power or reduce co-channel interference to nearby networks.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Figure 1:
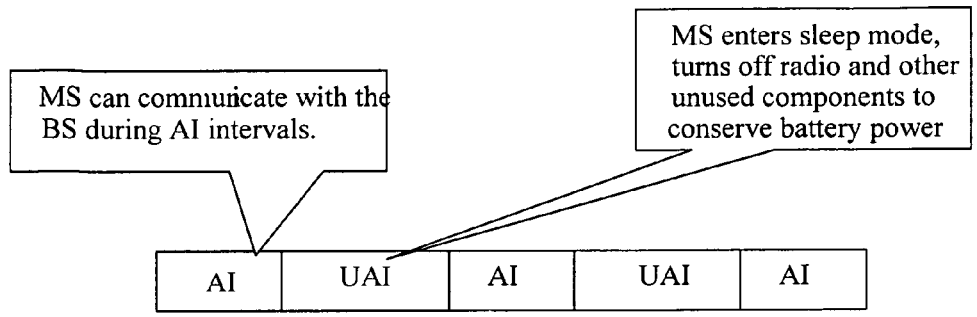
FIG. 1 shows a prior-art sleep pattern having a fixed pattern of available intervals and unavailable intervals.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e, 802.16m, or 3GPP standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth (RTM), ZigBee (TM), or the like. Embodiments of the invention may be used in various other apparatuses, devices, systems and/or networks. IEEE 802.11x may refer to any existing IEEE 802.11 specification, including but not limited to 802.11a, 802.11b, 802.11e, 802.11g, 802.11h, 802.11i, and 802.11n.

Figure 2A:
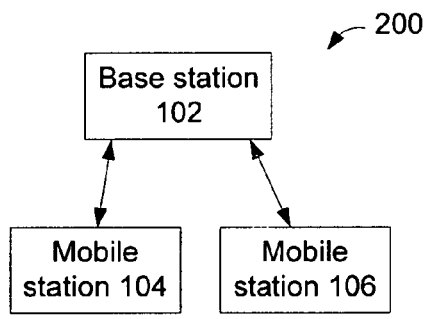
FIG. 2A depicts an example system in which a base station communicates with at least two mobile stations, in accordance with an embodiment.

FIG. 2A depicts an example system in which a base station 102 communicates with at least two mobile stations, in accordance with an embodiment. In this example, base station 102 communicates with mobile stations 104 and 106 using wireless communication techniques. Various embodiments use sleep-mode operation of a first radio access technology to permit operation of a second radio access technology. Techniques can be used at least for cases, such as mixed radio access technologies (RAT) mode operation on a single base station; femto-base station self-synchronization with a network; and femto-base station detection of a mobile station for proximity-based mobility management. In various embodiments, mode switching may be transparent to the mobile terminals. For example, a mode-1 mobile terminal understands and operates in mode-1, without knowing the existence of a second mode, mode-2. Mode switching can allow vendors to reduce the cost of mobile terminals because fewer terminals can be used to support various mixed radio access technologies (RAT) mode operation. Mode switching may allow operators to reduce the cost of deployment because they can deploy a single base station, instead of two different RAT base stations, to achieve a cell coverage of two RAT networks.

Figure 2B:
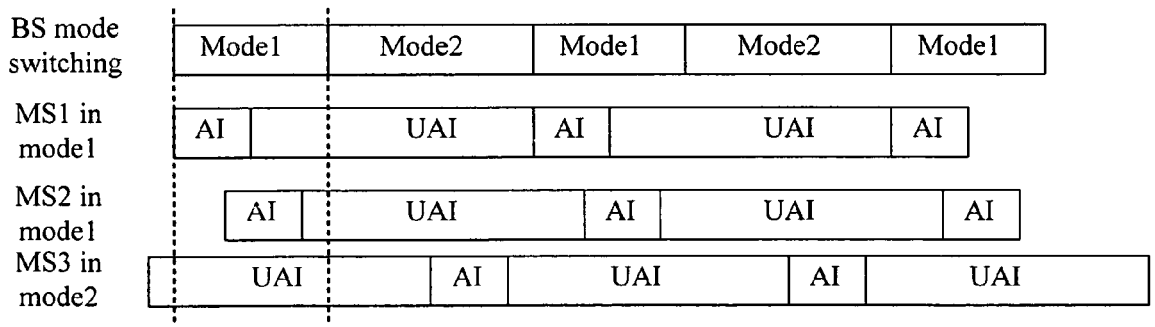
FIG. 2B depicts an example of transparent mode switching in which mode switching patterns are predefined at the base station, in accordance with an embodiment.

A general issue with mode switching is overhead and service continuity. If the access point/base station has to signal the mobile station to ignore operations occurring in the next few frames, overhead on the air link is incurred. In addition, such signaling introduces a delay which leads to relatively large gaps in mode switching and may impact the service continuity. FIG. 2B depicts an example of transparent mode switching in which mode-switching patterns are predefined at the base station, in accordance with an embodiment. In this example, mode-1 and mode-2 operations are interleaved in a regular pattern. When a mode-1 mobile station (MS) enters a network, the base station instructs the MS of its sleep pattern, such that the base station's mode-2 intervals occur during unavailable intervals (UAI) of the mobile station in mode-1. The base station establishes active intervals (AI) of mobile stations that operate in mode-2 to correspond to the base station's mode-2 intervals. Because the mode-1 mobile station communicates with a base station in the mobile station's AI within mode-1 intervals and the mode-2 mobile station communicates with the base station during UAI intervals of mode-1, mode switching is transparent to the mobile stations in the system. Because the sleep pattern is negotiated once during network entry by a mobile station, no further signaling occurs to maintain synchronization of mode switching. Sleep operations may be used to ensure synchronization of both sleep-mode operation and mode switching.

Figures 2C, 3:
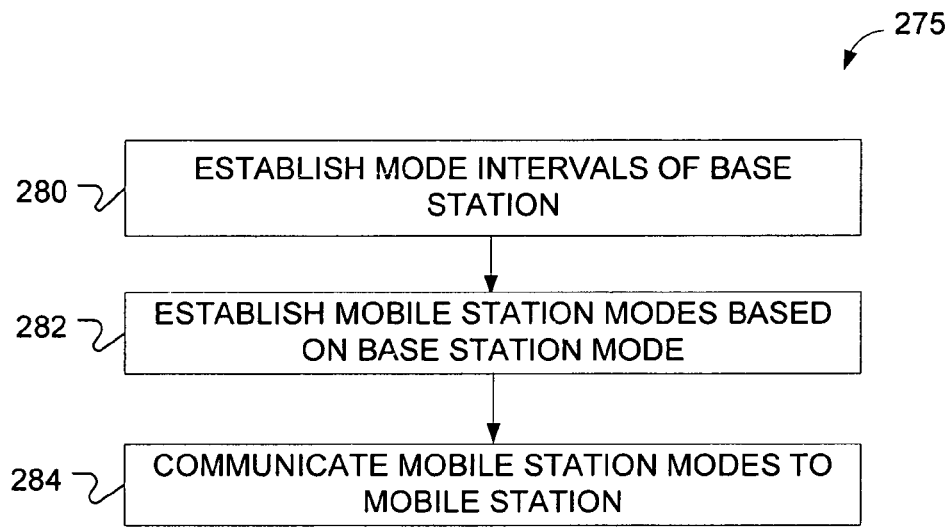
FIG. 2C depicts an example process that can be used to define the active intervals, in accordance with an embodiment.
FIG. 3 depicts a scenario in which a base station establishes a first mode of operation during a sleep mode of a second mode of operation and vice versa, in accordance with an embodiment.

FIG. 2C depicts an example process 275 that can be used to define the active intervals, in accordance with an embodiment. At 280, a base station establishes its mode intervals. For example, with reference to FIG. 2B, the mode intervals can be the mode-1 and mode-2 intervals in an interleaved pattern. At 282, a base station establishes sleep AI/UAI intervals of the mobile stations based on the established mode intervals of the base station. For example, with reference to FIG. 2B, the base station aligns active intervals of mobile stations MS1 and MS2 with mode-1 and aligns active intervals of mobile station MS3 with mode-2. At 284, the base station communicates the established mobile stations mode intervals to the mobile stations.

Process 275 of FIG. 2C can be used when multiple different radio access technologies (RAT) are deployed on the same base station to potentially avoid use of multiple base stations. For example, mode 1 may be 3GPP L TE (2009) and mode 2 may be IEEE 802.16e (2005)). For example, 3GPP LTE shares many PHY features with IEEE 802.16e and it may be cost efficient to implement both RATs on the same base station while providing service coverage to both types of mobile terminals. A base station can switch between LTE mode and IEEE 802.16e mode within short mode switching interval, e.g., approximately 5 to 10 ms, so that service continuity is not compromised for either LTE or IEEE 802.16e mobile terminals.

FIG. 3 depicts a scenario in which a base station establishes mode-1 operation during a sleep mode of mode-2 operation and vice versa, in accordance with an embodiment. In this example, a mode-1 is IEEE 802.16e, whereas a mode 2 is 3GPP LTE. An IEEE 802.16e mobile station operates in available mode during a portion of mode-1 (WiMAX mode) and in sleep mode during a portion of mode-2 (LTE mode). An LTE mobile station operates in available mode during mode-2 (LTE mode) and sleep mode during mode-1 (WiMAX mode). In one embodiment, to schedule the available and unavailable intervals of each mobile station, the base station (1) establishes its modes (e.g., mode 1 and mode 2) and (2) determines the available and unavailable intervals of each mobile station based on the base station mode pattern.

Because the subframe of LTE is 1 ms and frame length of WiMAX is 5 ms (e.g., uplink and downlink frames), all operations are based on integer numbers of 5 ms-length frames for both RATs. This may have an impact on the time when a mobile station turns on and tries to enter a Network, but has not negotiated sleep parameters yet. Also, some PHY layer timing, such as HARQ-acknowledge latency, may be configured to be sufficient for mode switching. In such a case, a mobile station may treat such unknown mode as a failed frame and initial entry may be a little slower than regular operation. After sleep parameters are configured, there may be no other special handling other than maintaining sleep operations on a frame-basis for both RATs.

In the scheme of FIG. 3, mode-1 can be IEEE 802.16m instead of IEEE 802.16e. In such case, the frame interval may be set to subframe level, with certain gap intervals present to align IEEE 802.16m and LTE's different subframe length (e.g., 1.25 ms and 0.5 ms, respectively). Because of the shorter mode switching interval, control information, which is typically broadcast every 5, 10, or 20 ms, may not be absent and thus cause no extra latency for initial entry by a mobile station or any noticeable change to PHY signaling.

Figure 4:
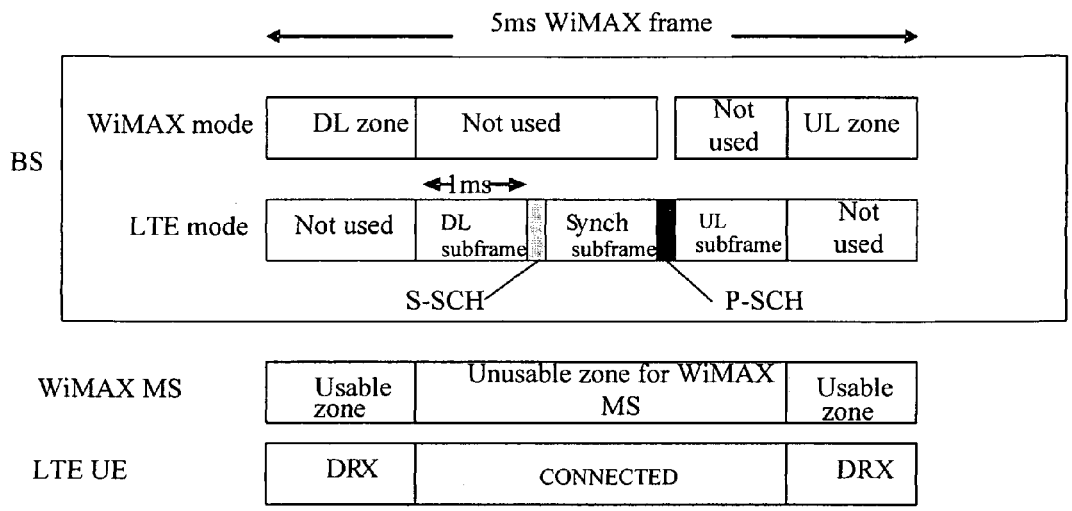
FIG. 4 depicts a manner of mode switching between two radio access technologies (RATs), in accordance with an embodiment.

FIG. 4 depicts a manner of mode switching between two radio access technologies, in accordance with an embodiment. A mode-interleaving pattern is aligned so that basic functions, such as downlink synchronization and scheduling information, can take place. In this example, the two RATs are IEEE 802.16e and 3GPP LTE, but other RATs can be used. IEEE 802.16e allows zoning in its DL/UL subframes so that a no-use period can be established during an IEEE 802.16e frame. The base station informs a mobile station that no IEEE 802.16e communications are to take place during the no-use period. In various embodiments, one or more LTE subframes may be transmitted during the no-use period within an IEEE 802.16e frame. The LTE subframes transmitted during the no-use period may be a downlink subframe, i.e., a synchronization subframe containing secondary and primary synchronization channels (shown respectively as SSCH and P-SCH) followed by an uplink subframe.

When a base station operates in IEEE 802.16e mode (WiMAX), downlink control information (preamble and MAP) may be transmitted during downlink communication to mobile stations every 5 ms. When a base station operates in LTE mode during the no-use period, transmission to mobile stations of downlink control information (synchronization channel S-SCH and primary synchronization channel P-SCH) may occur every 5 ms.

Figure 5A:
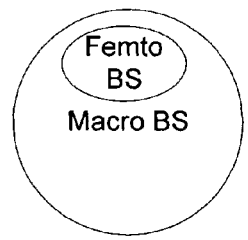
FIG. 5A depicts an example of cellular coverage by a femto-base station and a macro base station.

FIG. 5A depicts an example of cellular coverage by a femto-base station and a macro base station. A femto-base station may provide cell coverage within a cell region also covered by a macro base station. It is necessary yet challenging to achieve good synchronization between a femto-base station and a macro base station. For an OFDM-based network, synchronization among neighboring base stations is important because timing offset may cause severe interference. Synchronization can be maintained with technologies such as global positioning systems (GPS). With femto-cell deployment, indoor femto-base stations likely will not be able to receive a GPS signal and thus synchronization may be lost.

Figure 5B:
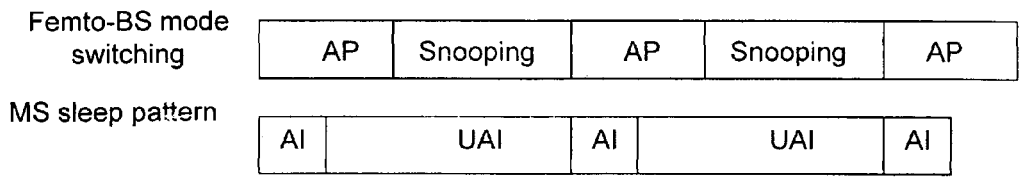
FIG. 5B depicts an example in which a femto-base station switches between access point (AP) mode and a snooping mode, in accordance with an embodiment.

FIG. 5B depicts an example in which a femto-base station switches between access point (AP) mode and snooping mode, in accordance with an embodiment. The femto-base station can periodically switch between a regular AP mode and snooping mode. In various embodiments, AP mode may be a regular access point mode in which downlink (DL) and uplink (UL) frames are aligned with a macro base station.

During snooping mode, a femto-base station stops communication with all mobile stations and all mobile stations are scheduled to sleep (i.e., UAI mode) and the femto-base station does not transmit to a mobile station. Instead, during snooping mode, the femto-base station monitors the down link control channel of one or more nearby macro base stations to receive synchronization information, such as a preamble or other broadcast information, which has a well-known position inside the frame structure. The femto-base station adjusts the timing of the femto-base station by aligning its own frame to the macro base station's frame arrival time to achieve synchronization with the macro base station. Propagation delay, if known to the femto-base station, can also be considered to fine tune the synchronization error. For example, the femto-base station may use the information to maintain synchronization in cases in which GPS is not available. This technique may achieve self-organization of femto-base station deployment and may reduce network maintenance cost. The cyclic prefix (CP) of the OFDM symbol is capable of handling the sum of delay spread and propagation delay of a macro-cell and it is sufficient for this CP to handle residual synchronization error because the coverage of femto-cell is overlain with that of the macro-cell.

In various embodiments, the sleep interval of mobile stations associated with the femto-base station may be arranged to skip these snooping intervals so that the snooping operation is totally transparent to the mobile stations. The snooping operation may take place a couple times a day to compensate clock drift so that service interruption would be minimal.

When femto-cell and macro-cell coverage overlap, a determination is made of when to trigger a handover from a macro-cell to a femto-cell. Because the mobile station is typically to hand over cell access point operation to a specific privately-owned femto-cell (e.g., its home femto-cell), the most ideal case is that the mobile station only performs scanning and network entry when it is in range of its target femto-cell. If the mobile station tries to perform scanning and network entry when not within its own femto-cell coverage, the mobile station may unnecessarily consume battery power and incur service interruption.

In an embodiment, during snooping mode, a femto-base station receives station identification information (station ID) from a mobile station that is transmitted to a macro-base station from time to time and listens for whether the mobile station with that station ID is in the vicinity of the femto-base station. When the femto-base station detects a mobile station's transmission with that station ID, the femto-base station cell informs the macro-base station that the mobile station is in the femto-base station's cell network.

Figure 5C:
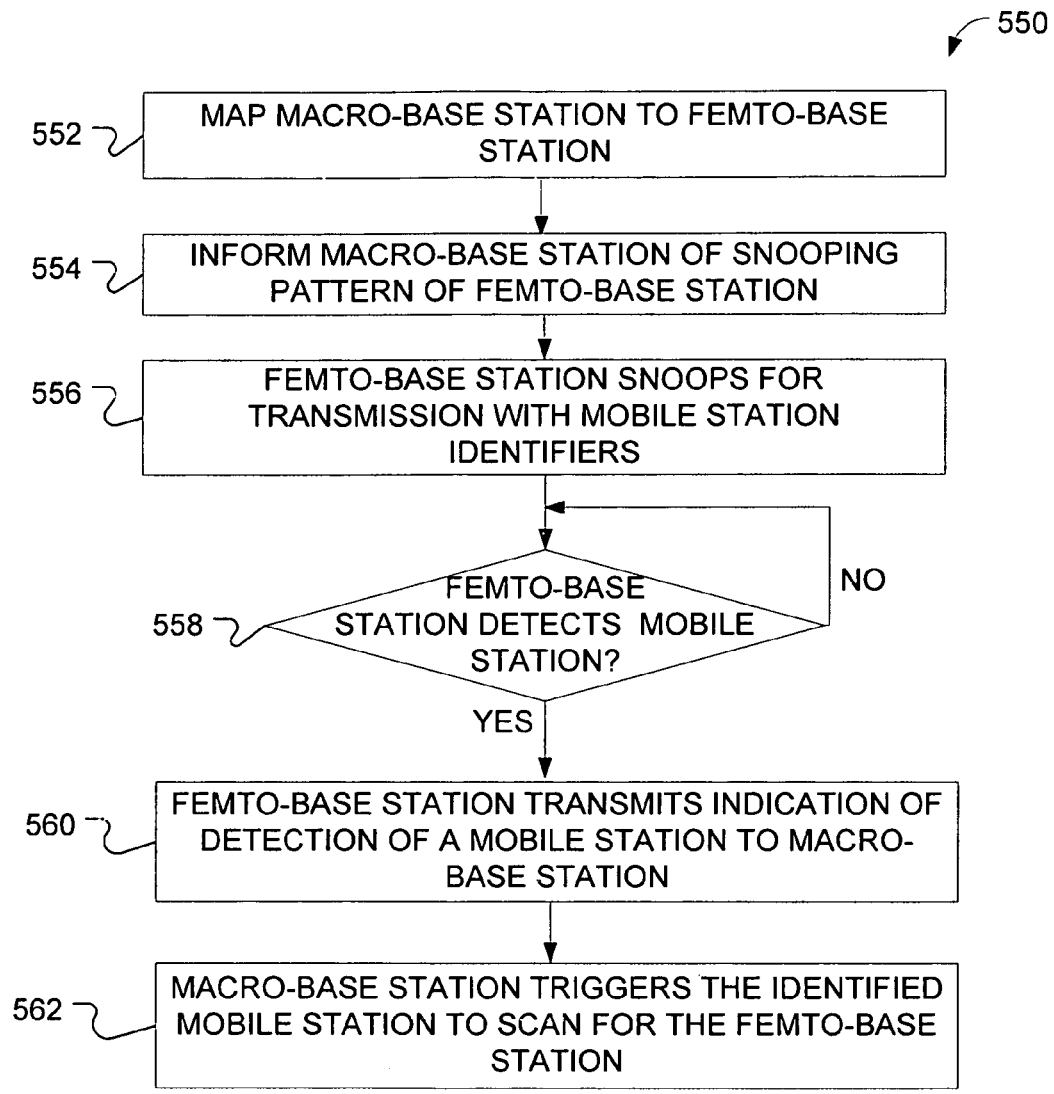
FIG. 5C depicts a process for handover of cell access point functions from a macro-base station to a femto-base station, in accordance with an embodiment.

FIG. 5C depicts a process for handover of cell access point functions from a macro-base station to a femto-base station, in accordance with an embodiment. At block 552, either the macro-base station or the mobile station stores the mapping of the macro-base station to its home femto-base station. Either a network (e.g., the femto-base station or some Authentication Authorization Accounting (AAA) server managing the whole network) or a mobile station decides whether a femto-base station is associated with a particular mobile station. Under the closed-subscriber-group scheme, when installing a femto-base station in a house, the femto-base station can be programmed so that only a particular mobile station(s) can be used with the femto-base station. A macro-base station transfers the mobile station's station ID to the femto-BS via a network backbone. For example, the station ID may be a 16-bit connection ID in 802.16e or a 4-bit flow ID in 802.16m.

At block 554, a femto-base station informs a macro-base station of the femto-base station's snooping pattern, so that the macro-base station can try to schedule the mobile station's transmission during the snooping interval.

At block 556, the femto-base station snoops for a mobile station with an associated station ID. The femto-base station tries to detect the uplink transmission with the mobile station's station ID. For example, the femto-base station may detect the mobile station by receiving a PHY layer burst associated with that station ID. In response to the femto-base station detecting the mobile station with an associated station ID, block 560 follows block 558. If the femto-base station does not detect the mobile station with an associated station ID, block 558 repeats.

At block 560, the femto-base station informs the macro-base station of a detection of a mobile station with an associated station ID.

At block 562, a macro-base station triggers the identified mobile station to scan for the femto-base station. For example, a macro-base station allows the mobile station to scan for the femto-base station when the mobile station is in the range of femto-base station, which is indicated by a successful snooping. Avoiding unnecessary scanning when the mobile station is not yet inside the coverage area of femto-base station reduces mobile station's power consumption and possible service interruption due to scanning.

By contrast to the techniques described with regard to FIG. 5B, for the techniques described with regard to FIG. 5C, the femto-base station may snoop a macro-base station's down-link control channel and also, or alternatively, uplink traffic/control channel in order to detect mobile station activity. The snooping interval may be longer for the technique described with regard to FIG. 5C, e.g., one or more frames, compared to a few symbols as with the technique described with regard to FIG. 5B, because the femto-base station listens to more control signaling and transmissions than it does for synchronization and may do so for a few frames to handle the uncertainty of macro-base station's scheduling. The snooping interval of the techniques of FIG. 5C may be more frequent to ensure hand over happens in a reasonable time frame.

In an overlay handover scenario such as that described with regard to FIG. 5C, latency (for communications over backbone, or triggering handover after a mobile station enters the femto-cell) is not very critical compared to regular handover cases described with regard to FIG. 5B, because signal strength from serving macro-base station is sufficient. Hundreds of milliseconds or even a few seconds latency for the femto-base station/mobile station discovery may be acceptable. Instead, conserving mobile station battery power and reduces unnecessary signaling in the network are the main concern.

Because a femto-cell typically serves a small number of mobile stations (known as closed subscriber group, e.g. family members sharing the same plan), the femto-cell is generally not heavily loaded and this allows the femto-base station to use the mode switching described with regard to FIGS. 5B and 5C more frequently for other purposes, without compromising the basic service. The femto-base station shall align the sleep UAI intervals of those already associated mobile stations with its snooping interval, such that snooping is transparent to these mobile stations. Even with snooping once every 100 ms (for a 5 ms WiMAX frame length, this is only about 1/20 total time), the impact on the associated mobile stations is negligible and yet handover performance for mobile station incoming to the femto-cell could be much improved.

Embodiments of the present invention may be provided, for example, as a computer-program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method, comprising:
   scheduling at a base station of a wireless communication network a first radio access terminal mode for a first mobile station during a first time region of a radio frame, the first time region of the radio frame comprising a downlink communication region, an unused time region, and an uplink time communication region, the unused time region including a second time region;
   scheduling at the base station a sleep mode for the first mobile station during the second time region of the radio frame; and
   scheduling at the base station a second radio access terminal mode for a second mobile station during the unused time region of the first time region of the radio frame.

2. The method of claim 1, wherein the first radio access terminal mode complies at least with IEEE 802.16e (2005).

3. The method of claim 1, wherein the second radio access terminal mode complies at least with 3GPP LTE (2009).

4. The method of claim 1, further comprising:
   sending from the base station to the second mobile station a downlink subframe during the unused time region;
   sending from the base station to the second mobile station primary and secondary synchronization channels during the unused time region;
   sending from the base station to the second mobile station a synchronization subframe during the unused time region; and
   receiving at the base station an uplink subframe from the second mobile station during the unused time region.

5. The method of claim 1, further comprising:
   performing at the base station operations related to the second radio access terminal mode in a manner that is transparent to the first mobile station operating in the first radio access terminal mode.

6. A method, comprising:
   scheduling at a base station of a wireless communication network a first radio access terminal mode for a first mobile station during a first time region of a radio frame, the first time region of the radio frame comprising a downlink communication region, an unused time region, and an uplink time communication region, the unused time region including a second time region;
   scheduling at the base station a sleep mode for the first mobile station during the second time region of the radio frame;
   scheduling at the base station a second radio access terminal mode for a second mobile station during the unused time region of the first time region of the radio frame; and
   communicating to the first and second mobile stations the first and second time regions of the radio frame.

7. The method of claim 6, wherein the first radio access terminal mode complies at least with IEEE 802.16e (2005).

8. The method of claim 6, wherein the second radio access terminal mode complies at least with 3GPP LTE (2009).

9. The method of claim 6, further comprising:
   communicating from the base station to the second mobile station a downlink subframe during the unused time region;
   communicating from the base station to the second mobile station primary and secondary synchronization channels during the unused time region;
   communicating from the base station to the second mobile station a synchronization subframe during the unused time region; and
   receiving at the base station an uplink subframe from the second mobile station during the unused time region.

10. The method of claim 6, further comprising:
    performing at the base station operations related to the second radio access terminal mode in a manner that is transparent to the first mobile station operating in the first radio access terminal mode.

* * * * *